United States Patent [19]
Flakne

[11] 3,864,068
[45] Feb. 4, 1975

[54] HOT MELT EXTRUSION APPARATUS
[75] Inventor: John R. Flakne, Minneapolis, Minn.
[73] Assignee: General Mills, Inc., Minneapolis, Minn.
[22] Filed: Feb. 9, 1973
[21] Appl. No.: 330,935

[52] U.S. Cl............. 425/192, 264/177 F, 425/378, 425/382.2, 425/464
[51] Int. Cl............................................. B29f 3/04
[58] Field of Search ........ 425/382.2, 464, 192, 131, 425/198, DIG. 49, 37 B, 377, 379; 264/176 F, 177 F, 171

[56] References Cited
UNITED STATES PATENTS
3,176,345    4/1965    Powell .................................. 425/131
3,381,336    5/1968    Wells .................................. 425/378
3,492,692    2/1970    Soda et al. .......................... 425/131

Primary Examiner—R. Spencer Annear
Assistant Examiner—Mark Rosenbaum
Attorney, Agent, or Firm—Anthony A. Juettner; Gene O. Enockson; Norman P. Friederrichs

[57] ABSTRACT

Disclosed is apparatus for extruding hot melt fibers. The apparatus includes die plates having easily renewable extrusion orifices.

7 Claims, 6 Drawing Figures

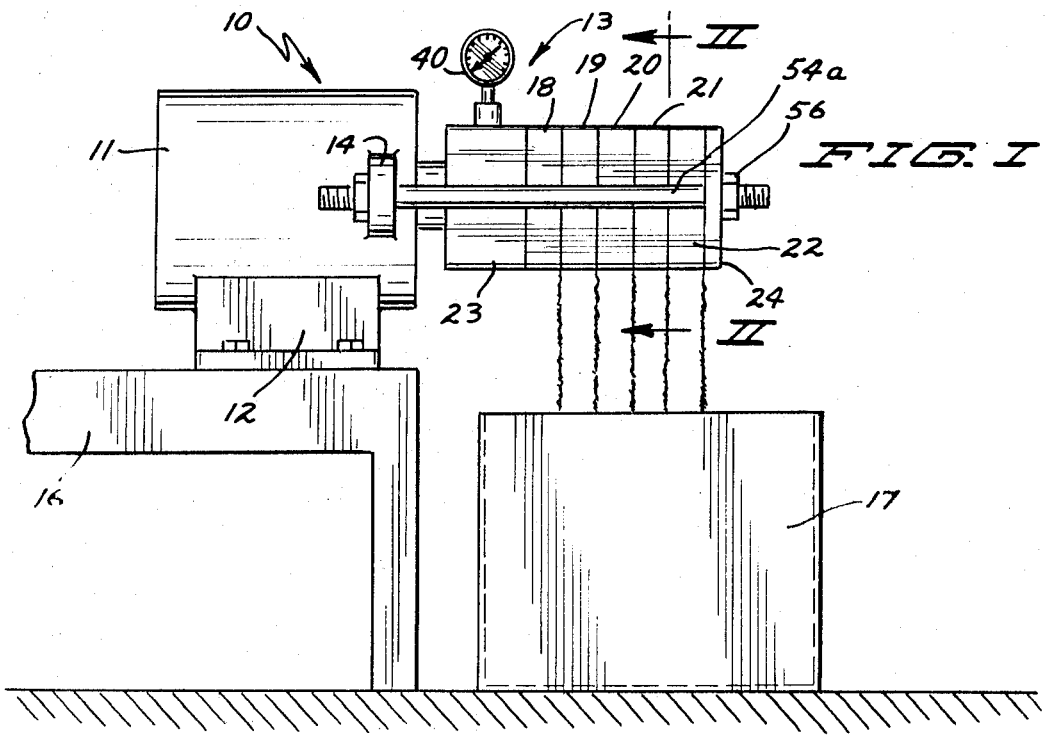
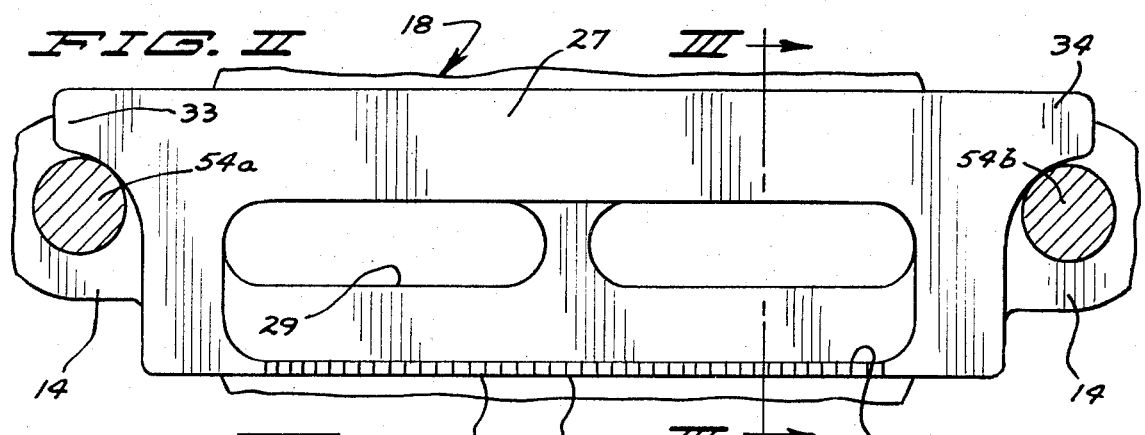
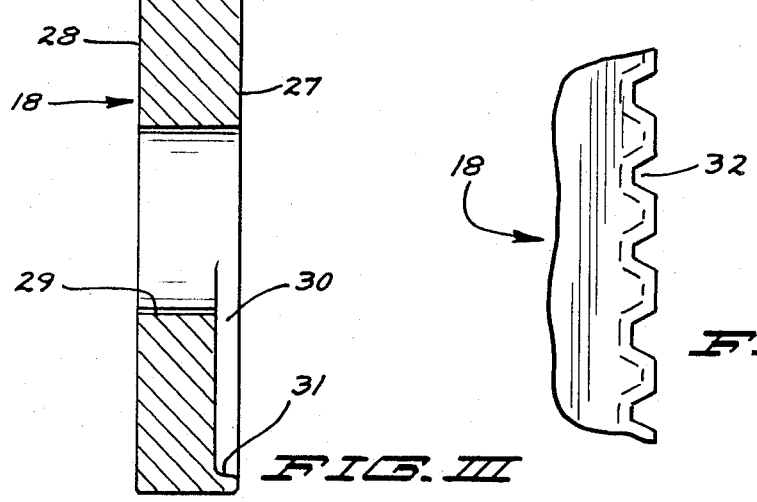

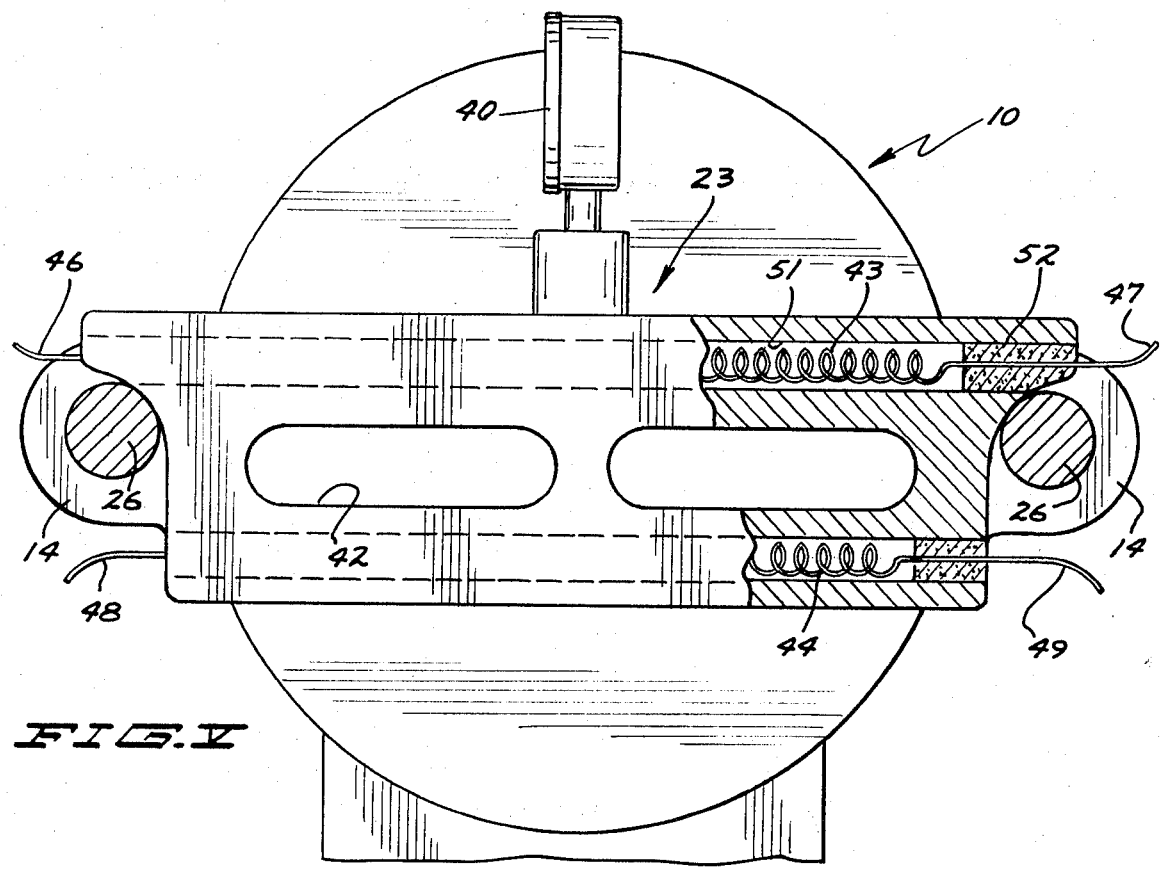
FIG. V
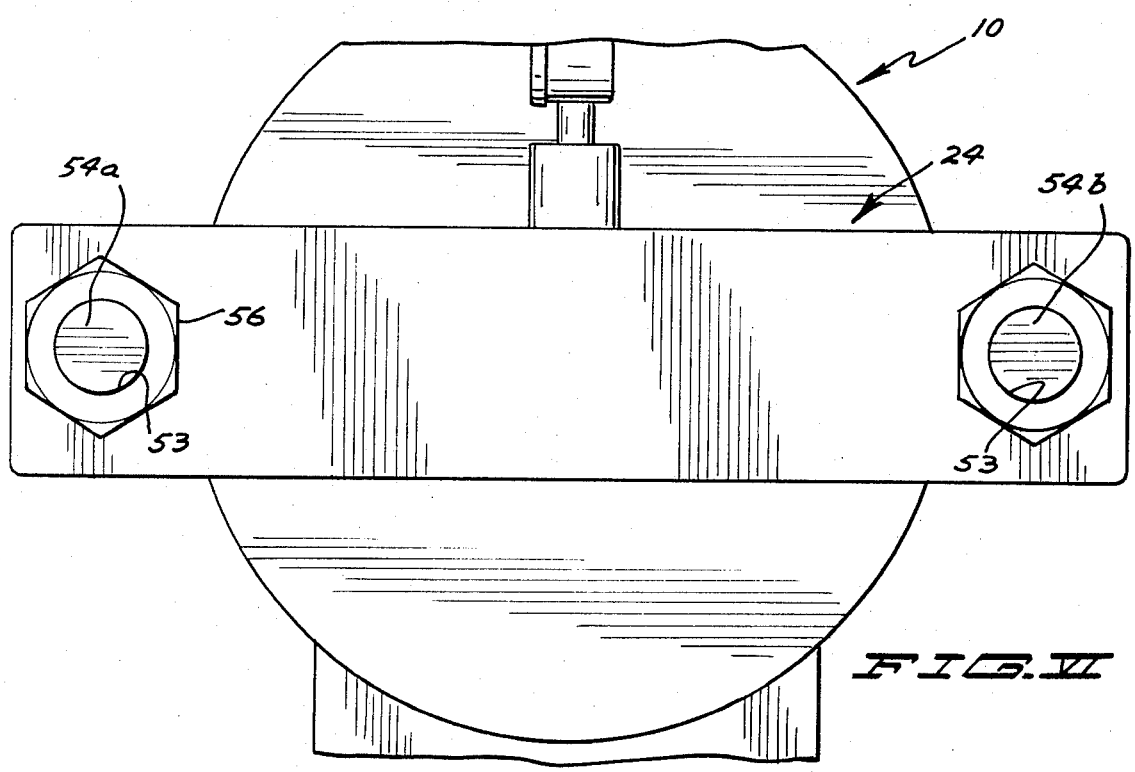
FIG. VI

HOT MELT EXTRUSION APPARATUS

The present invention relates to extrusion apparatus and more particularly to apparatus for extruding hot melt filaments or fibers.

Apparatus has been known in the past for hot melt extrusion of filaments or fibers from various thermoplastic materials such as nylon. Such apparatus has typically included a heated screw extruder coupled with a filament die. In the past such filament dies have been provided by drilling very fine openings through a die plate. Although such apparatus has been used commercially, certain problems have been encountered. For example, drilling the very fine holes in the die plate is difficult. Although such die plates operate satisfactorily for a period of time, eventually the openings become enlarged or worn at which time the die plates are normally discarded and replaced with new die plates. In veiw of the difficult manufacture of such die plates and in view of the limited life thereof, the die plates remain a significant cost in filament production.

The present invention overcomes the disadvantages of the previously known filament extrusion apparatus by providing easily manufactured die plates which die plates, once worn, are also easily renewed for further use. The present die plates are more convenient than previous die plates since they may be quickly and easily removed from the extrusion apparatus. The present invention also provides various other advantages which may be recognized by the following description.

IN THE DRAWINGS

FIG. 1 shows the extrusion apparatus of the present invention;

FIG. II is a view of a die plate taken along the lines II—II in FIG. I;

FIG. III is a cross-sectional view of a die plate taken along the lines of III—III in FIG. II; and FIG. IV is an enlarged view of a portion of a die plate.

FIG. V is a view of a heater plate with portions broken away;

FIG. VI is a view of an end plate.

The filament or fiber extruder 10 of the present invention, one embodiment of which is shown in FIG. I, may include an extruder barrel 11, a base 12 and a die 13. Extruder 10 may be suitably supported such as on table 16. Any container may be used for receiving the product from extruder 10 such as the fiber receiver 17.

The extruder barrel 11 may be of any type suitable for producing a dough at the desired temperature and at the necessary pressures. For example, the extruder barrel 11 may be a screw extruder; alternatively, it may be a piston type extruder. The extruder barrel 11 may include a heated jacket to assist in elevating the temperature of the dough to extrusion temperature. The extruder barrel 11 may include a flange 14 on each side thereof for purposes hereinafter described.

The extrusion die 13 may include a plurality of die plates 18, 19, 20, 21 and 22, a heater plate 23 and an end plate 24. The die plates 18, 19, 20, 21 and 22 may be identical; therefore, only die plate 18 will be described. The die plate 18 may be constructed from any suitable material, for example, from a steel plate. The die plate 18 (FIGS. II–IV) has a forward machined surface 27 and a rear machined surface 28. The die plate 18 has one or more flow channels 29. The die plate 18 further includes a recessed passageway 30 which interconnects flow channel 29 with the extrusion channels 32 defined in ridge 31, thereby providing extrusion orifices. The channels 32 are preferably provided in ridge 31 by knurling.

The knurling may be at an angle such that the channels 32 are tapered or in other words funnel shaped thereby reducing the pressure loss in channels 32 during extrusion. Any desired number of knurls per inch may be provided. The knurls may be of any desired shape such as triangular, rectangular, circular and the like. The die plate 18 further includes a pair of laterally extending shoulders 33 and 34 at each side thereof.

The heater plate 23 (FIG. V) may be constructed from a metal plate and has flow channels 42. The heater plate 23 may be of an electrical resistance type and may include a temperature gauge 40. The heater plate 23 includes suitable heating elements such as the electrical resistance coils 43, 44 which are connected to an electrical source (not shown) by wires 46, 47 and 48, 49 respectively. The heating elements such as coil 43 may be mounted by drilling an opening 51 through plate 23 and inserting coil 43 therein with the lead wires 46 and 47 extending out of the plate 23. A sealing material 52 may be inserted in each end of opening 51. The material 52 may be a heat settable ceramic material.

The end plate 24 (FIG. VI) may be constructed from a metal plate and may be of substantially the same size as die plate 18. End plate 24 has a pair of openings 53 through which bolts 54 may extend. Plate 23 serves to seal the forward end of the series of die plates.

The extrusion die 13 (FIG. I) may be secured to the extruder barrel 11 by a pair of bolts 54a and 54b which are threaded at one end for reception of nuts such as nut 56. The bolts 54 each extend through an opening defined in flange 14 on extruder barrel 11. The heater plate 23 and die plates 18-22 may be inserted between the bolts 54a and 54b and are supported thereon by the shoulders 33 and 34. The end plate 24 is mounted on bolts 54 and the nuts 56 may then be tightened down sufficiently to provide a seal between the various plates. The extruder 10 then may be placed in operation. The extruder barrel 11 heats and plasticizes the extrusion material which is forced forwardly through the flow channels 29. A portion of the plastic dough flows through each of the respective passages such as 30 and passes through the channels 32 in the ridge 31. The fibers 41 may be cooled by contact with the air or other suitable fluid and solidified. Any desired number of die plates may be included so long as there is sufficient flow capacity from the extruder barrel 11 and sufficient flow channel capacity to feed the extrusion channels. If a substantial number of such die plates are used, however, it may be desirable to include additional heater plates spaced along the series of die plates in order to maintain the extrusion material at the desired temperature.

The die plates may be renewed after extended use by loosening bolts 54 and removing the worn die plate such as 18 simply by lifting them out. The forward surface may be machined sufficiently to remove the extrusion channels 32. The ridge 31 may then be again knurled. The renewed die plate 18 may be returned to the die 13. The die plates may be renewed several times before enough die plate has been machined away to make the die plate useless. At that time the die plate is replaced with a new die plate.

Although one preferred embodiment of the present invention has been disclosed, it should be recognized that various modifications may be made without departing from the scope of the present invention. For example, if desired, the die plates 18-22 may be reversed so that the passage way 30 faces toward the extruder barrel 11 rather than away from barrel 11. Also, if desired a pair of die plates such as 18 and 19 may be positioned such that two extrusion channels face each other providing a single extrusion orifice.

The embodiments of the invention in which an exclusive property or privilege is claimed are defined as follows:

1. A filament extrusion apparatus including means for supplying extrusion material at extrusion pressure; means for heating said extrusion material to a plastic condition; and die means, said die means including a plurality of identical die plates, each of said die plates including a pair of laterally extending shoulder means, said apparatus including a pair of rod means on which said shoulder means may rest for support, each of said die plates having first and second machined surfaces, a flow channel defined through each of said die plates, a ridge along one edge of each die plate, said ridge having defined therein a plurality of orifices and a flow passageway interconnecting said flow channel and said orifices.

2. The apparatus of claim 1 including a heater plate.

3. The apparatus of claim 1 wherein the outer surface of said ridge comprises a knurled surface thereby providing said orifices.

4. The apparatus of claim 3 wherein said knurled surface provides extrusion channels having a funnel-like shape.

5. The apparatus of claim 4 wherein said extrusion channels are triangular in cross-section.

6. The apparatus of claim 4 wherein said extrusion channels are rectangular in cross-section.

7. The apparatus of claim 4 wherein said extrusion channels are circular in cross-section.

* * * * *